F. A. WENMAN.
FINDER.
APPLICATION FILED JAN. 28, 1920.
1,406,124.
Patented Feb. 7, 1922.
2 SHEETS—SHEET 2.
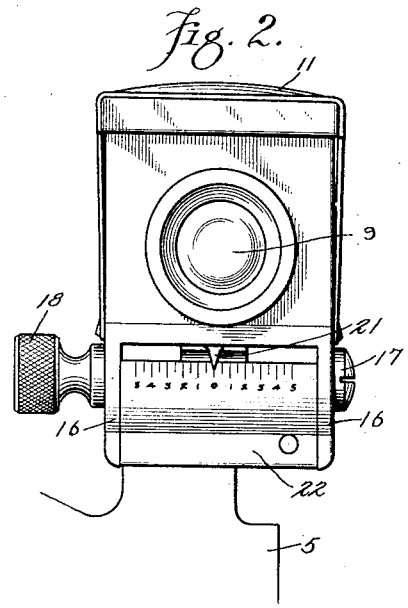
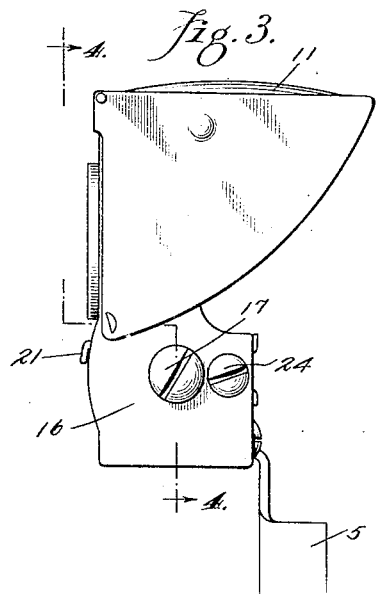
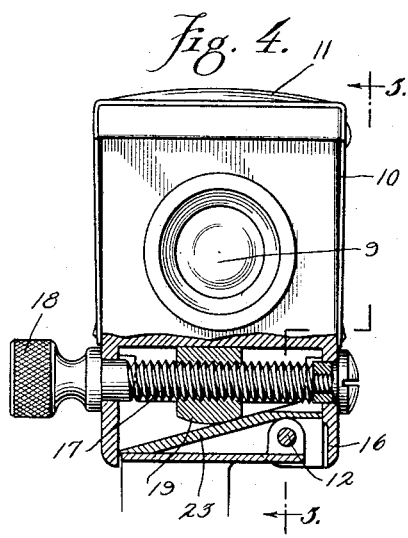
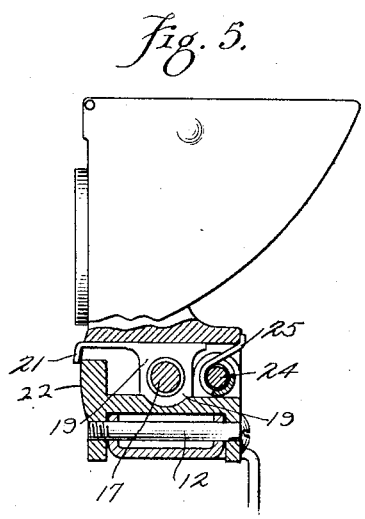
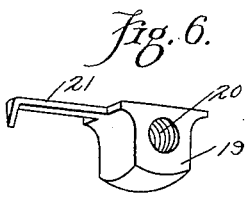
WITNESSES
INVENTOR
FREDERICK ALDIS WENMAN.
BY
ATTORNEYS

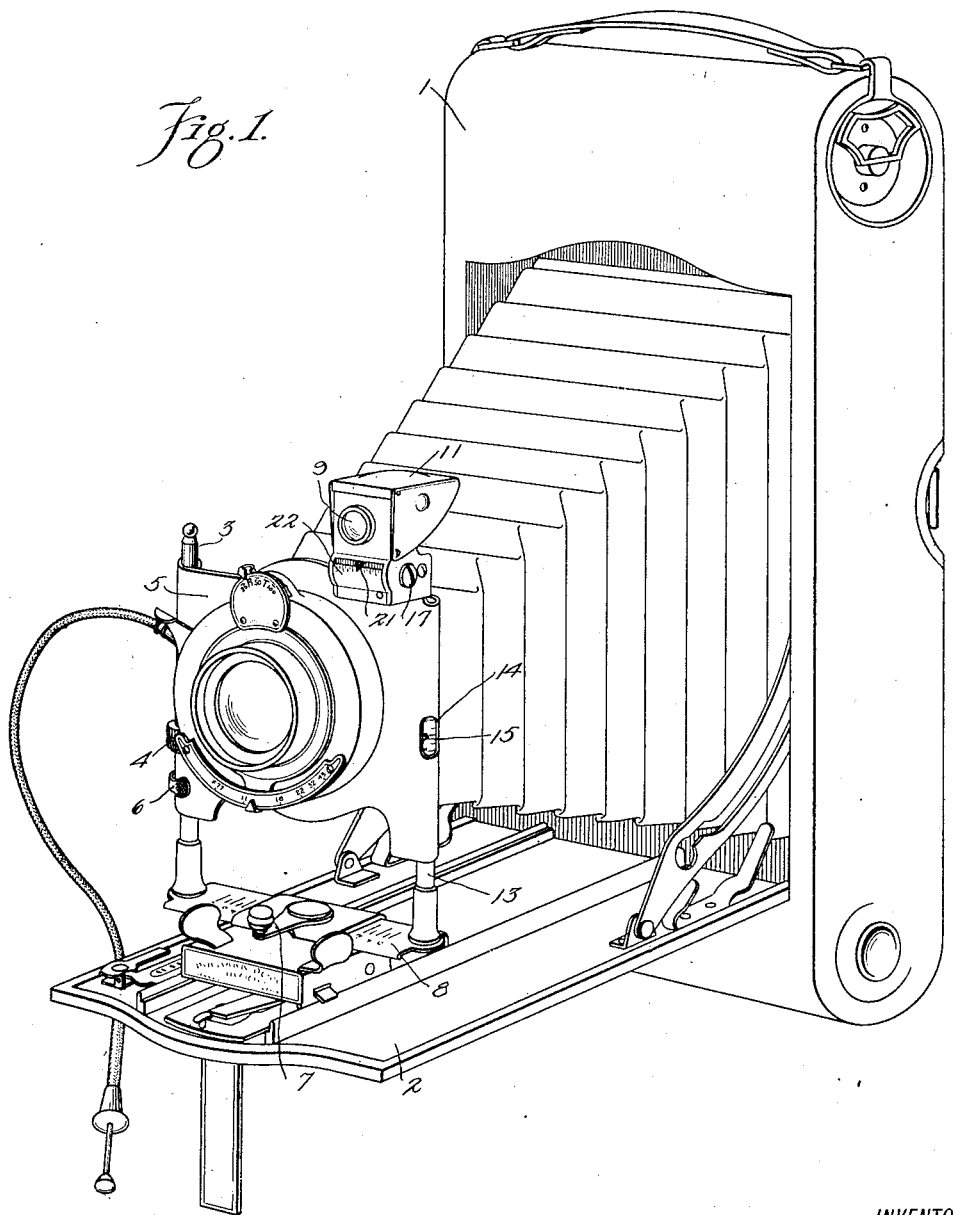

UNITED STATES PATENT OFFICE.

FREDERICK ALDIS WENMAN, OF BROOKLYN, NEW YORK.

FINDER.

1,406,124. Specification of Letters Patent. Patented Feb. 7, 1922.

Application filed January 28, 1920. Serial No. 354,650.

*To all whom it may concern:*

Be it known that I, FREDERICK ALDIS WENMAN, a citizen of the United States, and a resident of the city of New York, borough of Brooklyn, in the county of Kings and State of New York, have invented a new and useful Finder, of which the following is a full, clear, and exact description.

In connection with finders, and more particularly such finders as are associated with photographic instruments, various defects have been experienced, chief of which are as follows:

According to the instruction books furnished in connection with many cameras it is stated that "any object which does not show in the finder, will not show in the picture." This statement is misleading in that it gives the novice the impression that the finder is an absolutely accurate device. As a matter of fact it cannot be depended upon for an accurate centering of an image any nearer than a six foot focus. When the camera is placed nearer an object to be photographed than this distance, the finder may not be depended upon to sight with the instrument, and the finder may merely be used as a guide.

This defect is to be attributed to the fact that a difference will exist in any instance between the image appearing upon the sensitized medium within the camera and that shown in the finder, for the reason that the fields of the lens and finder do not exactly coincide.

It will be further appreciated that the ratio of the included area to the unincluded area with respect to the fields of the camera and finder forever increases in proportion to the increase in distance between the object to be photographed, and the lens of the camera, and there always remains outside of the field of the lens an area continually diminishing, but never vanishing.

For this reason it has been quite customary to adjust the finders slightly off center with respect to the axis of the camera, so as to exclude much of the area appearing within the field of the finder which would not appear upon the sensitized medium within the camera. This provision has proved most satisfactory in that, assuming that the fields of both the finder and camera do coincide at a given distance, the lens extending parallel to the axes of these two members, would intersect, and consequently any object short or beyond this point of intersection would not have its true area appearing upon the sensitized medium represented in the field of the finder.

This defect has been more or less immaterial in view of the fact that the average photographer does not endeavor to portray pictures which call for a focus of under six feet, and for all practical purposes the present day finder with respect to this feature, is ample for the average amateur photographer. However, it is well appreciated that two adjustments are provided on substantially all better types of folding cameras, to-wit, a vertical adjustment to be used when the photographer is endeavoring to take a picture of a tall building, or similar objects, at a relatively short distance, or to focus downwardly by means of this adjustment, for instance a tower, and photographing objects on the ground, as well as to perfectly include objects on an equal or on a higher plane than that upon which the camera is situated. This adjustment eliminates the objectionable feature in negatives which is found so often in the work of amateurs, in that the object appears to be tilted for the reason that the camera has been held in a position out of the horizontal.

The second adjustment is dapted for use when photographing a long row of buildings or similar objects from a position slightly in front of the row in advance of the first object in the same. This adjustment permits of a photograph having depth, or in other words, the negative produced does not present and does not feature the initial house or object in the row representing the balance of the same as an almost flat surface.

Commercial finders now upon the market make no provision for these two adjustments in that the plane of the finder is always parallel to the lens, while with this adjustment a line extending axially through the center of the sensitized surface and lens would be at an angle to a line extending through the finder. Consequently the operator must rely upon guess work, especially when using roll film to know what will be included within the sensitized area within the camera when either of the adjustments named are used, in view of the fact that the area of the finder, as aforestated, will not coincide with the area of the camera.

It will be appreciated that quite often negatives which are incapable of duplication are entirely spoiled due to the fact that the operator is not cognizant of what will be reproduced upon the sensitized medium, and in view of the fact that due to this reason, the adjustment may be above or below the proper point.

With these defects in view I have now provided a finder which may be utilized to overcome the short focus effect in that it will positively include the area which will be reproduced upon the sensitized medium, but whose primary object is to be found, in that an accurate adjustment for both horizontal and vertical planes, and a consequential coinciding of the area within the finder and upon the sensitized medium, may be produced.

Although my invention is particularly applicable to a finder associated with cameras, it will readily be appreciated that the same might be utilized in connection with any type of work to which it might be found adaptable.

Reference is had to the attached sheets of drawings which illustrates one practical embodiment of my invention.

Figure 1 is a perspective view of a camera modified in structure to conform to my invention, and having applied thereto my improved type of finder;

Figure 2 is a front view of the finder;

Figure 3 is a side view of the same;

Figure 4 is a sectional view taken along lines 4—4 of Figure 3;

Figure 5 is a sectional side view taken along lines 5—5 of Figure 4, and,

Figure 6 is a perspective view of a certain detail of construction.

In various views like reference numerals designate similar parts, and the reference numeral 1 indicates a camera boxing constructed in a conventional manner, with which there is associated a hinged base 2 mounting the truck and other accoutrements necessary, conventionally associated with the standard pocket camera.

As is well known the vertical adjustment is provided with a screw thread formed in one of the forward vertical standards 3, which cooperates by means of a thumb nut 4 associated with the lens, a shutter block 5, a locking member 6 being also associated with the block 5 so as to insure against shifting of the block with respect to the standard 3.

Horizontal adjutment in the conventional construction is also provided by means of a clamping member 7 cooperating with a base plate 8 extending between the vertical standards.

By means of these two adjustments the shutter and lens block of the camera may be shifted so as to afford depth and non-tilting in the production of the negative.

A finder incorporating certain parts of the usual construction is mounted upon the block 5, this finder including a lens 9, side walls 10 a combined hood and cover 11 hingedly associated with the side walls 10. This structure is mounted in a well known manner by means of a pivot pin 12 providing a hinged connection between the lens block 5 and the finder, so as to permit of the taking of horizontal and vertical pictures upon sensitized medium within the camera.

Contrary to the conventional structure, the base plate 8 has imprinted or otherwise formed in its upper face, a scale, as has been clearly shown in Figure 1, which scale conforms to a scale associated with the vertical standard 13, the lens and shutter block 5 being provided wtih a cut-out portion at this point, as has been indicated at 14, which cut-out portion is preferably formed with an indicating finger 15, which gives a true rating of the scale forming a part of the standard 13.

It will be noted upon reference to Figure 2 and subsequent figures, that my finder is constructed so as to conform to the space permissible within the camera 1 when the same is folded, so that no alterations of the conventional construction will have to be resorted to upon my improved finder being applied thereto.

It will now be noted upon examination of the figures referred to that a base portion 16 forms a part of the finder, and that such base portion has extending between its side walls a screw 17 provided with a finger knob 18, which permits of a ready turning of the same.

Mounted within the base portion 16 is a block 19 formed with a screw thread opening 20, through which the screw 17 is adapted to project. Conveniently associated with the forward edge of the block 19 is an indicating arm 21, which is adapted to register with a scale applied to a plate 22, closing the forward end of the base portion 16, which scale conforms in its indicating marks (of any suitable character), to the scales forming a part of the standard 13 and base plate 8.

The upper face of the lowermost surface of the base portion 16 is in the form of an inclined plane, as has been noted at 23, and it will be seen that the block 19 bears with its lower face against this incline, as has been clearly illustrated in Figure 4, its upper face contacting with the lower face of the base of the finder, which base is swingingly secured to the portion 16 by means of a pin 24, which has associated with it a spring preferably coiled, as has been indicated at 25, one of the ends of the spring being secured to the pin 24, its opposite end bearing against the base of the finder, and serving at all times to cause a swinging of the forward portion of the same downwardly, so as to insure a firm working contact between the base of the finder and the upper face of the block 19.

Assuming that the lens block is to be raised or lowered so as to permit of the taking of a photograph which will be non-tilting or perfect in every respect, the finder may be tilted by means of the screw 17, which is operated by the knob 18, by reason of which the object to be photographed may be completely included in the field of the finder.

It will now be appreciated that the reading on the scale forming a part of the plate 22 with which the indicating arm 21 registers, may be read, and the thumb nut 4 adjusted so that the block 5 is elevated or lowered to a position at which the indicating finger 15 registers with the scale forming a part of the standard 13, which position will permit of a reproduction of an image within the camera corresponding to the area included within the field of the finder in its new position.

In view of the fact that the scale upon the base plate 8 conforms to the other two scales forming a part of my improved construction, the finder in its vertical position will also permit of an adjustment permitting a horizontal picture to be taken in that the scale forming a part of the base plate 8 may be adjusted to conform to the reading of the scale of the plate 22.

Obviously the adjustment desired might be obtained also by placing the camera first in a horizontal position and then swinging the finder in a position at right angles to that which it normally assumes, and then utilizing the adjustment provided as a part of the finder and the camera subsequently adjusted to the reading of the finder.

In fact the finder may be used in its two positions in a number of different combinations with the camera body to produce the results desired.

From the foregoing it will be appreciated that I have constructed a finder which is not necessarily limited to its association with a camera, but when placed in this position is unlimited in its use in connection with the rising and sliding front, since the finder dispenses with the necessity of viewing the image before the exposure, by means of a ground glass, which has heretofore been resorted to.

It is to be understood that the invention may be applied with equal ease to either a plate or film camera to serve the purpose desired, and it will act as a perfectly satisfactory substitute in all respects other than focusing, which is provided by means of the usual scale forming a part of the base 2.

It will further be seen that I have constructed a device of this nature which shall be so simple in operation as to be capable of being utilized by anyone able to operate a conventional camera, and at the same time the adaption of my construction to any conventional camera will not result in the sacrificing of its former compactness, lightness or simplicity of operation.

Finally it is to be understood that the improved construction of finder described and shown in the foregoing specification and drawings has conveniently forming a part of it a suitable leveling device of any desired construction which shall indicate the true position of the base of the camera.

Obviously numerous modifications of structure might well be resorted to without in the least departing from the scope of my invention, which I claim as:

1. A device of the class described including a support, a finder movably mounted upon such support, such finder including a base portion, the lower face of such base portion being inclined, a rotatable screw threaded rod extending through said portion, a block mounted upon such rod and bearing with its lower face against the inclined portion, its upper face contacting with the lowermost portion of the finder proper.

2. A device of the class described, including a plate formed with grooves upon its outer face, a finder rockingly secured to said plate, means adapted to co-act with said finder to rock the same, said means carrying an indicating arm adapted to extend to the outer face of said plate, and to align with the grooves upon the outer face of said plate, whereby to indicate the degree of inclination of said finder.

3. A device of the class described, including a base portion, a pin extending across said base portion and secured thereto, a finder rotatably mounted upon said pin, a spring attached to said pin and bearing against said base portion and finder for seating the latter upon the former, and means co-acting with said finder and base portion for tilting the former with respect to the latter.

FREDERICK ALDIS WENMAN.